United States Patent
Ito et al.

(10) Patent No.: US 10,573,939 B2
(45) Date of Patent: Feb. 25, 2020

(54) SECONDARY BATTERY WITH FILM SHAPED SENSOR

(71) Applicant: HONDA MOTOR CO., LTD., Minato-ku, Tokyo (JP)

(72) Inventors: Keiichi Ito, Wako (JP); Junji Yasuda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 152 days.

(21) Appl. No.: 15/822,527

(22) Filed: Nov. 27, 2017

(65) Prior Publication Data

US 2018/0151922 A1 May 31, 2018

(30) Foreign Application Priority Data

Nov. 28, 2016 (JP) .................................. 2016-229879

(51) Int. Cl.
| | |
|---|---|
| *H01M 10/00* | (2006.01) |
| *H01M 10/48* | (2006.01) |
| *H01M 2/06* | (2006.01) |
| *H01M 10/0525* | (2010.01) |
| *H01M 10/0587* | (2010.01) |

(52) U.S. Cl.
CPC ........... *H01M 10/486* (2013.01); *H01M 2/06* (2013.01); *H01M 10/0525* (2013.01); *H01M 10/0587* (2013.01)

(58) Field of Classification Search
CPC .. H01M 10/486; H01M 2/06; H01M 10/0525; H01M 10/0587
See application file for complete search history.

(56) References Cited

U.S. PATENT DOCUMENTS

| | | | |
|---|---|---|---|
| 2013/0093398 A1* | 4/2013 | Takabayashi | H01M 2/021 320/128 |
| 2014/0370338 A1* | 12/2014 | Lim | H01M 2/348 429/62 |
| 2015/0064525 A1* | 3/2015 | Henrici | H01M 2/1673 429/90 |

FOREIGN PATENT DOCUMENTS

WO  2015/040684 A1  3/2015

* cited by examiner

*Primary Examiner* — Nicholas P D'Aniello
(74) *Attorney, Agent, or Firm* — Carrier Blackman & Associates, P.C.; William D. Blackman; Joseph P. Carrier

(57) ABSTRACT

A secondary battery includes a resin film, reference electrodes, temperature sensors, reference electrode wiring lines and temperature sensor wiring lines that are insulating from one another, and an insulating resin cover layer. In the resin film, a connector part connecting a detector part and a terminal part extends from the inside to the outside of the container through a seal member. Each of the reference electrode wiring lines and the temperature sensor wiring lines extend through the connector part to the terminal part. A resin cover layer is provided for the detector part and the connector part, covers the temperature sensors, the reference electrode wiring lines, and the temperature sensor wiring lines, and exposes the reference electrodes.

9 Claims, 14 Drawing Sheets

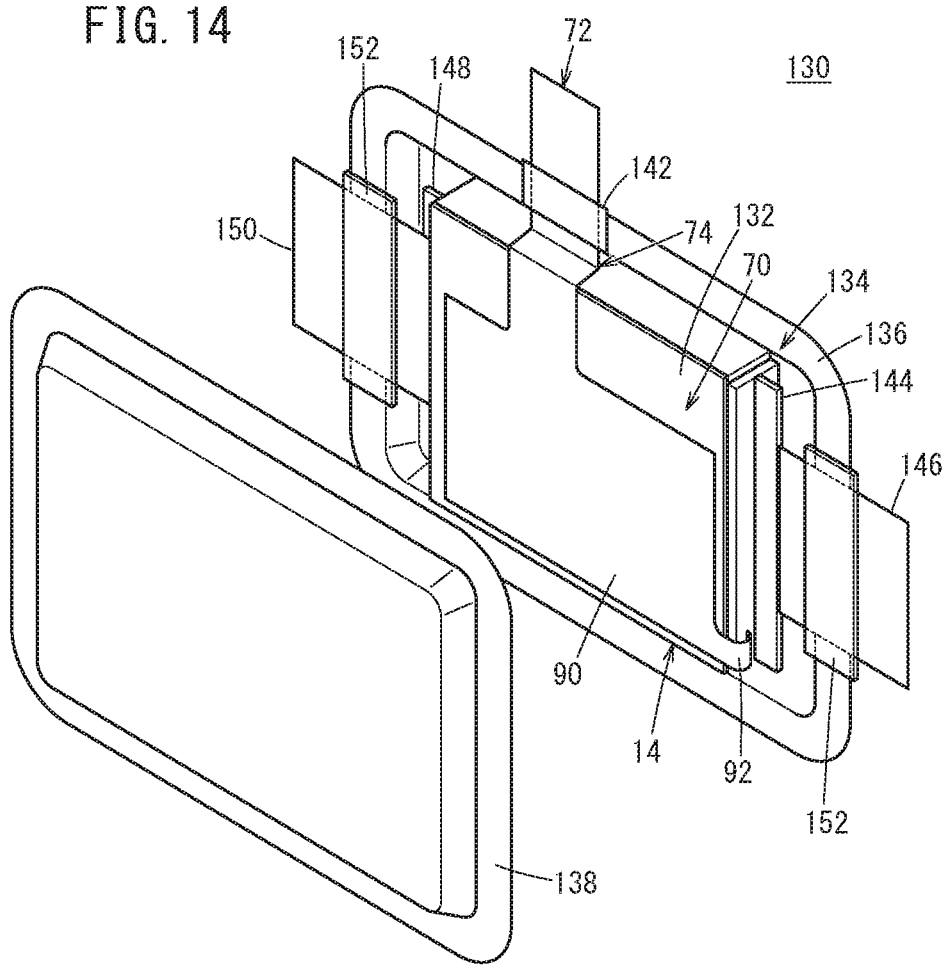

SECONDARY BATTERY WITH FILM SHAPED SENSOR

CROSS-REFERENCE TO RELATED APPLICATION

This application is based upon and claims the benefit of priority from Japanese Patent Application No. 2016-229879 filed on Nov. 28, 2016, the contents of which are incorporated herein by reference.

BACKGROUND OF THE INVENTION

Field of the Invention

The present invention relates to a secondary battery including a reference electrode and a temperature sensor.

Description of the Related Art

In order to achieve the long product life of a secondary battery such as a lithium ion secondary battery, it is required to control the operating condition based on the electric potential of each of a positive electrode and a negative electrode and/or the temperature inside the secondary battery. To this end, International Publication No. WO 2015/040684 proposes a secondary battery having a reference electrode with a thermometer function, which has a function of a temperature sensor and a function of the reference electrode. The reference electrode with the thermometer function is formed by connecting the reference electrode and the temperature sensor to a metal wire in series, or bonding the reference electrode to the temperature sensor connected to a metal wire.

Further, the reference electrode with the thermometer function is provided in a container. In the container, a positive electrode, a separator, a negative electrode, and another separator are stacked together in the order recited a plurality of times to form an electrode body, and the electrode body and electrolytic solution are placed in the container. The reference electrode with the thermometer function is electrically insulated from the positive electrode and the negative electrode. Specifically, another separator is interposed between the positive electrode and the negative electrode. The reference electrode with the thermometer function is inserted between two separators that face each other, or the reference electrode with the thermometer function is provided at a position where the positive electrode and the negative electrode do not face each other.

SUMMARY OF THE INVENTION

In the reference electrode with the thermometer function where the reference electrode and the temperature sensor are connected in series and in the reference electrode with the thermometer function where the reference electrode is directly bonded to the temperature sensor, measurement results of the reference electrode and the temperature sensor are detected through the common metal wire. As described above, in the case where the measurement results of the reference electrode and the temperature sensor cannot be detected independently, electrical noises tend to be included in detection values of the reference electrode with the thermometer function. Therefore, it becomes difficult to accurately measure the electric potentials of the positive electrode and the negative electrode, and it becomes difficult to accurately measure the temperature inside the secondary battery.

Further, as described above, in the case where the additional separator is provided between the positive electrode and the negative electrode for electrically insulating the reference electrode with the thermometer function from the positive electrode and the negative electrode, since the distance between the positive electrode and the negative electrode is increased by providing the separator, the overpotential becomes large. In contrast, in the case where the reference electrode with the thermometer function is provided at a position where the positive electrode and the negative electrode do not face each other, the distance between each of the positive electrode and the negative electrode and the reference electrode becomes large, and the overpotential becomes large, and the temperature sensor is significantly distanced from the portion where the temperature changes easily in the secondary battery. Therefore, for also these reasons, it becomes difficult to accurately measure the electric potential and/or the temperature.

Further, in the case where the reference electrode with the thermometer functions is inserted between the two separators positioned between the positive electrode and the negative electrode, the metal wires are brought into line contact with the separators. Therefore, the load applied from the metal wires to the separators tends to be large. For example, if any of the separators is damaged by this load, eventually, the reference electrode with the thermometer function is short circuited with the positive electrode or the negative electrode, and it becomes impossible to measure the electric potential and/or the temperature.

Furthermore, in the above reference electrode with the thermometer function, in order to detect the measurement results of the reference electrode and the temperature sensor, two metal wires are taken out from the inside to the outside of the container for each set of the reference electrode and the temperature sensor. At the take-out port of the metal wires, a seal member for sealing the portion between the metal wire and the container needs to be provided so as to maintain the liquid tightness of the inside of the container. However, it is not easy to seal the portion between the substantially cylindrical metal wires and the container. Therefore, there is a concern that it becomes difficult to maintain the liquid tightness of the container.

In this regard, it becomes possible to improve the accuracy of measuring the electric potential and the temperature of the secondary battery by increasing the number of the reference electrodes with the thermometer function to increase the measurement positions as many as possible. However, if the number of the reference electrodes with the thermometer function is increased, since the number of take-out ports and the seal members are increased as well, it becomes difficult to maintain the liquid tightness of the container to a greater extent, and the structure of the secondary battery becomes complicated. Consequently, the production efficiency of the secondary battery is lowered undesirably.

A main object of the present invention is to provide a secondary battery which makes it possible to measure the electric potential of each of a positive electrode and a negative electrode and the temperature inside the secondary battery highly accurately.

Another object of the present invention is to provide a secondary battery having simple structure which makes it possible to maintain the liquid tightness of a container suitably.

According to an embodiment of the present invention, a secondary battery comprises a container containing an electrode body and electrolytic solution, the electrode body including a positive electrode and a negative electrode configured to face each other through a separator, the secondary battery comprising a resin film comprising a detector part provided inside the container, a terminal part provided outside the container, and a connector part extending from inside to outside of the container through a seal member and connecting the detector part and the terminal part, at least one reference electrode and at least one temperature sensor provided for the detector part, a film-shaped reference electrode wiring line, one end of the reference electrode wiring line being electrically connected to the reference electrode and another end of the reference electrode wiring line extending to the terminal part through the connector part, a film-shaped temperature sensor wiring line, one end of the temperature sensor wiring line being electrically connected to the temperature sensor and another end of the temperature sensor wiring line extending to the terminal part through the connector part, the film-shaped temperature sensor wiring line being electrically insulated from the reference electrode wiring line, and an insulating resin cover layer provided for the detector part and the connector part, and configured to cover the temperature sensor, the reference electrode wiring line, and the temperature sensor wiring line, and expose the reference electrode.

In the secondary battery according to the present invention, as described above, the film-shaped reference electrode wiring lines connected to the reference electrodes and the film-shaped temperature sensor wiring lines connected to the temperature sensors are provided on the insulating resin film. Therefore, the reference electrode wiring lines and the temperature sensor wiring lines can be provided easily in the state where the reference electrode wiring lines and the temperature sensor wiring lines are electrically insulated from one another. In the structure, the measurements results by the reference electrodes and the temperature sensors can be detected independently without any interference. That is, the electric potential differences between the reference electrodes and the positive electrode or the negative electrode can be detected using the reference electrode wiring lines without any noises in the electric potential differences. Likewise, the temperatures inside the container measured by the temperature sensors can be detected using the temperature sensor wiring lines without any noises in the temperatures.

As described above, the insulating resin cover layer is provided for the detector part and the connection part. The insulating resin layer covers the temperature sensor, the reference electrode wiring line, and the temperature sensor wiring line, and exposes the reference electrode. Further, simply by providing the detector part in a manner that one surface of the detector part where the reference electrode is exposed faces the separator, the reference electrode and the temperature sensor, etc. can be provided inside the container in the state where the reference electrode, the temperature sensor, etc. are electrically insulated from the positive electrode and the negative electrode.

Therefore, for example, unlike the case where the reference electrode and the temperature sensor, etc. are provided between the separators additionally provided between the positive electrode and the negative electrode, it is possible suppress the excessive overpotential due to the increase in the distance between the positive electrode and the negative electrode. Further, unlike the case where the reference electrode and the temperature sensor are provided at positions where the positive electrode and the negative electrode do not face each other, it is possible to suppress situations where the overpotential becomes excessive due to the increase in the distance between the positive electrode or the negative electrode and the reference electrode, and it is possible to suppress the increase in the distance between the portion where temperature changes easily inside the secondary battery and the temperature sensor.

As described above, the reference electrode wiring line, and the temperature sensor wiring line provided on the resin film are in the form of films, and covered with the resin cover layer. The reference electrode wiring line, the temperature sensor wiring line, etc. are brought into surface contact with the positive electrode or the negative electrode and/or the separators through the resin cover layer. Therefore, for example, unlike the case where the wiring lines are metal wires which are in line contact with the positive electrode or the negative electrode and/or the separators, it is possible to avoid the excessive load from being applied to the positive electrode, the negative electrode, and the separators. In the structure, since it is possible to suppress damage of the positive electrode, the negative electrode, and the separators, etc., there is no concern that short-circuiting of the reference electrode wiring lines and/or the temperature sensor wiring lines, etc. with the positive electrode or the negative electrode occurs, and that measurement of the electric potential and/or the temperature becomes difficult.

As described above, in the film-shaped connector part provided with the film-shaped reference electrode wiring lines and the film-shaped temperature sensor wiring lines and the resin cover layer covering the reference electrode wiring lines and the temperature sensor wiring lines, the portion facing the take-out port for taking the connector part from the inside to the outside of the container has substantially the flat surface. Further, if the numbers of the reference electrodes and the number of temperature sensors are increased to improve the measurement accuracy, the number of reference electrode wiring lines and the number of temperature sensor wiring lines provided on the connector part are increased as well. Also in this case, since the number of the connector part itself does not change, there is no need to provide any additional take-out part. Further, the portion where the connector part faces the take-out port remains substantially the flat surface. Therefore, regardless of the number of the reference electrodes and the number of the temperature sensors, it is possible to seal the portion between the connector part and the container easily, and maintain the liquid tightness of the inside of the container suitably.

As described above, in the secondary battery, it is possible to measure the electric potentials of the positive electrode and the negative electrode, and the temperatures inside the container highly accurately, and with the simple structure, it is possible to maintain the liquid tightness of the inside of the container suitably.

In the secondary battery, preferably, the electrode body includes a portion where the positive electrode, the negative electrode, and the separator are stacked together a plurality of times, the detector part includes a main part with one surface facing the separator, and at least one extension part extending from the main part, and interposed between layers of the electrode body in a manner that one surface of the extension part faces the separator which forms a layer different from a layer the main part faces, and at least one of the reference electrode and the temperature sensor is provided for the extension part. In this case, it is possible to provide the extension part at the desired position in the electrode body easily. Therefore, by providing suitable numbers of the reference electrodes and the temperature sensors at suitable positions of the extension part and the main part, it is possible to improve the measurement accuracy of the electric potentials and the temperatures.

In the secondary battery, the connector part may extend from the inside to the outside of the container through a slit provided for the container, the seal member may be made of elastic material inserted between an inner surface of the slit and the connector part under pressure, and a holder plate covering the seal member in the slit may be fixed to the container. In this case, the slit provided for the container serves as the take-out port for taking the connector part from the inside to the outside of the container. As described above, the portion of the connector part facing the inner surface of the slit has the substantially flat surface as described above. Therefore, by inserting the seal member made of elastic material between the inner surface of the slit and the connector part under pressure, it is possible to maintain the liquid tightness of the container easily and suitably. Further, since the seal member inserted into the slit under pressure is covered with the holder plate, further improvement in the reliability of sealing the container is achieved.

In the secondary battery, the container may be in the form of a laminate film, and the seal member may be made of resin configured to bond an inner surface of an outer marginal portion of the container and the connector part together. In the structure, simply by providing the substantially flat connector part between the outer marginal portions of the container in the form of laminate films to stack the marginal portions and the connector part together, and bonding the portion between the marginal portions and the connector part by the resin seal member, it is possible to maintain the liquid tightness of the container easily and suitably.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 14 is an exploded perspective view showing the secondary battery in FIG. 13.

DESCRIPTION OF THE PREFERRED EMBODIMENTS

Hereinafter, a preferred embodiment of a secondary battery according to the present invention will be described in detail with reference to the accompanying drawings.

Examples of the battery which can be used as the secondary battery include secondary batteries of metal ions such as lithium, sodium, nickel hydrogen batteries, alkaline manganese batteries, and metal ion air batteries, metal ion all solid batteries, etc., or fuel cells such as a solid polymer fuel cell. Hereinafter, with reference to FIGS. 1 to 10, an example where a secondary battery 10 according to the embodiment of the present invention is a lithium ion secondary battery will be described.

Figure 1:
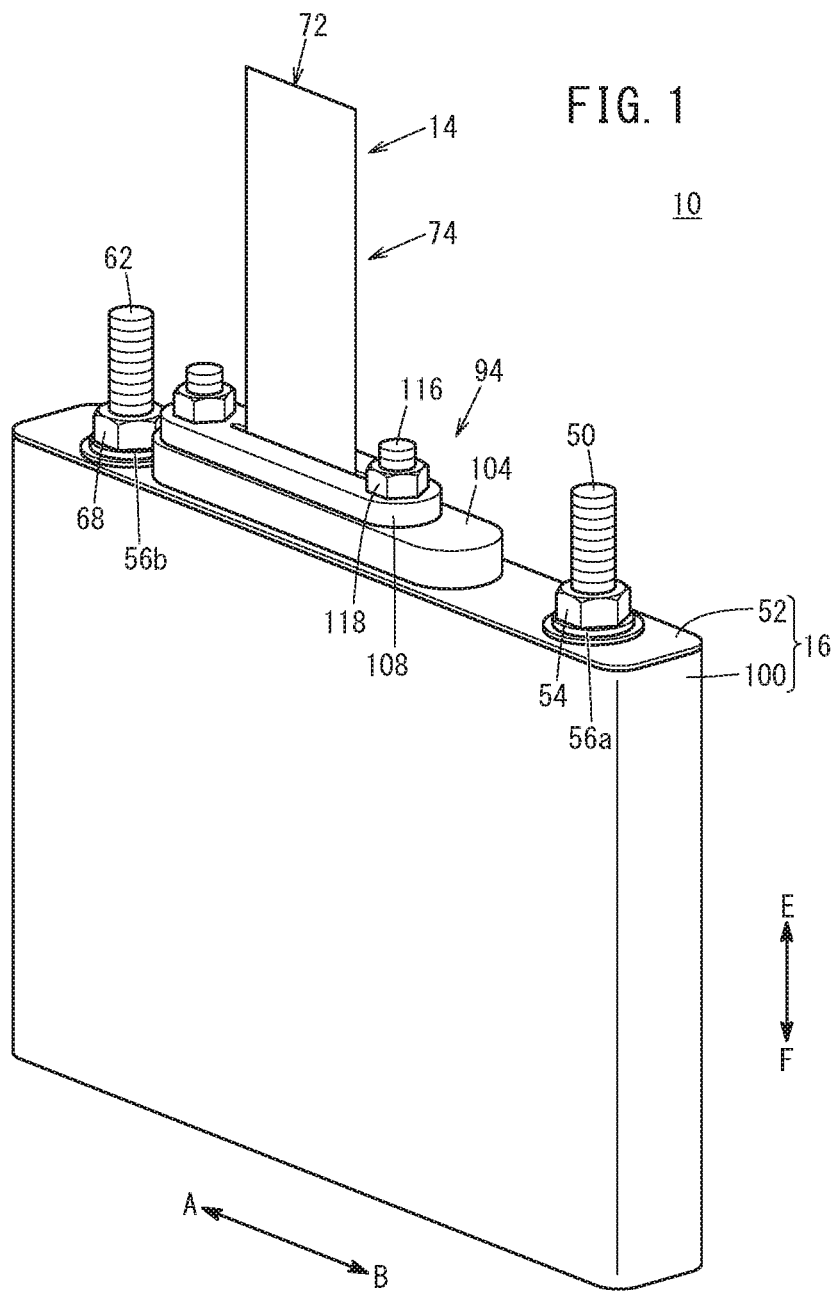
FIG. 1 is a perspective view showing outer appearance of a secondary battery according to an embodiment of the present invention.
Figure 2:
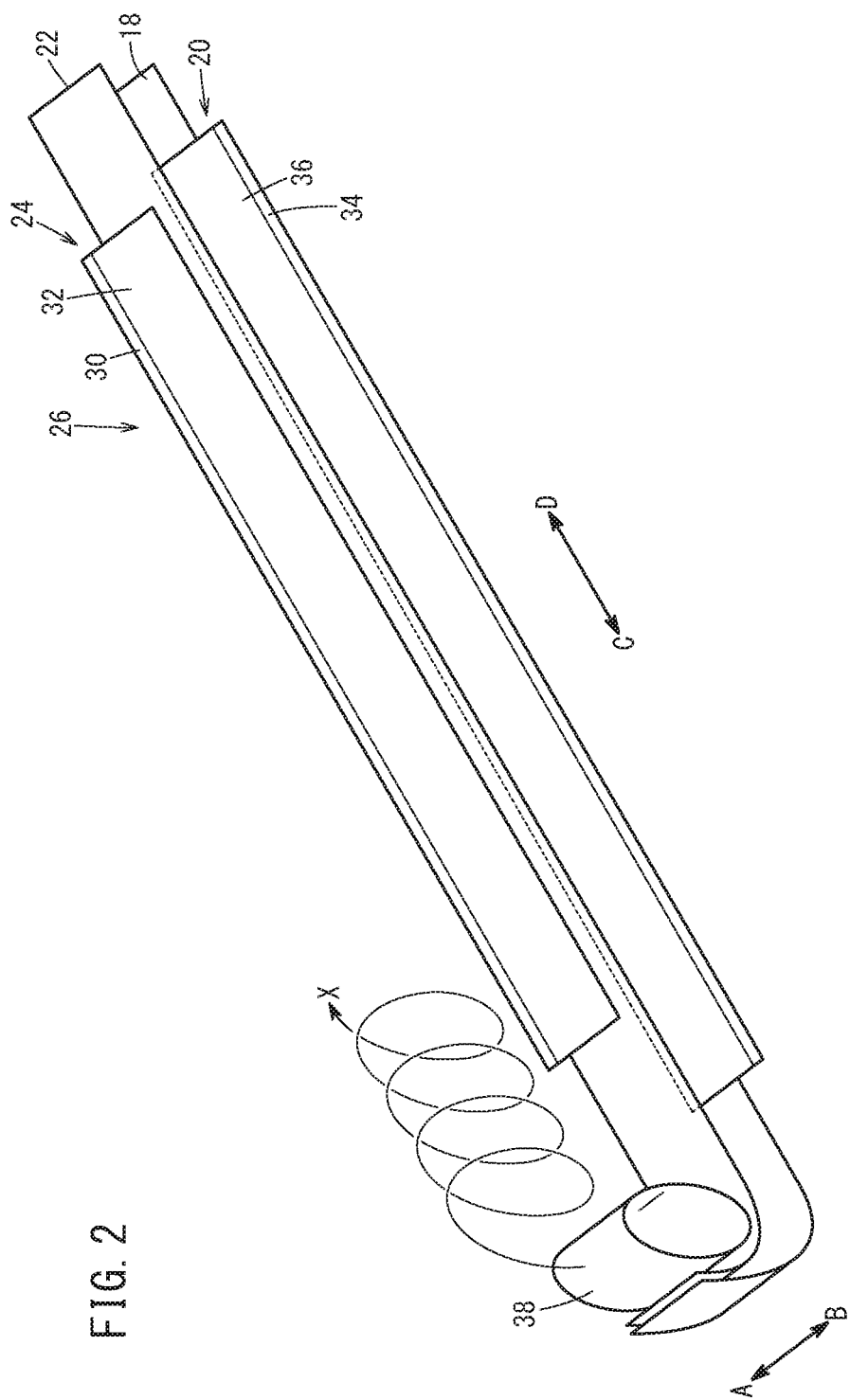
FIG. 2 is a view schematically showing the process of producing an electrode body from a stack body.
Figure 3:
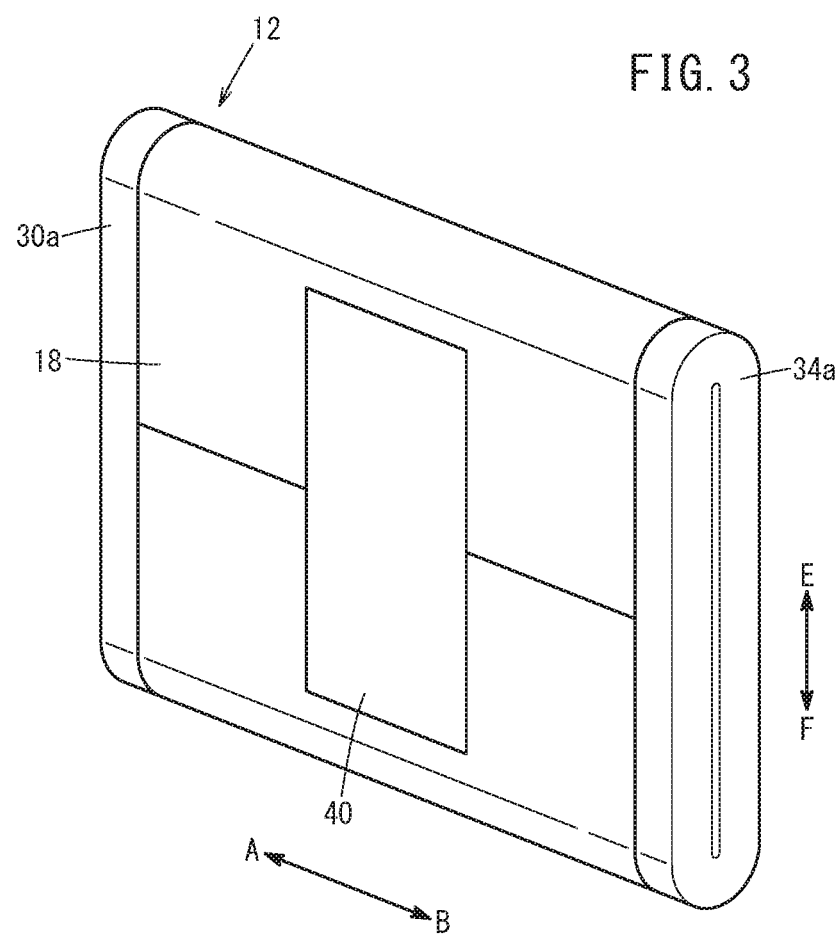
FIG. 3 is a perspective view showing outer appearance of the electrode body.
Figure 10:
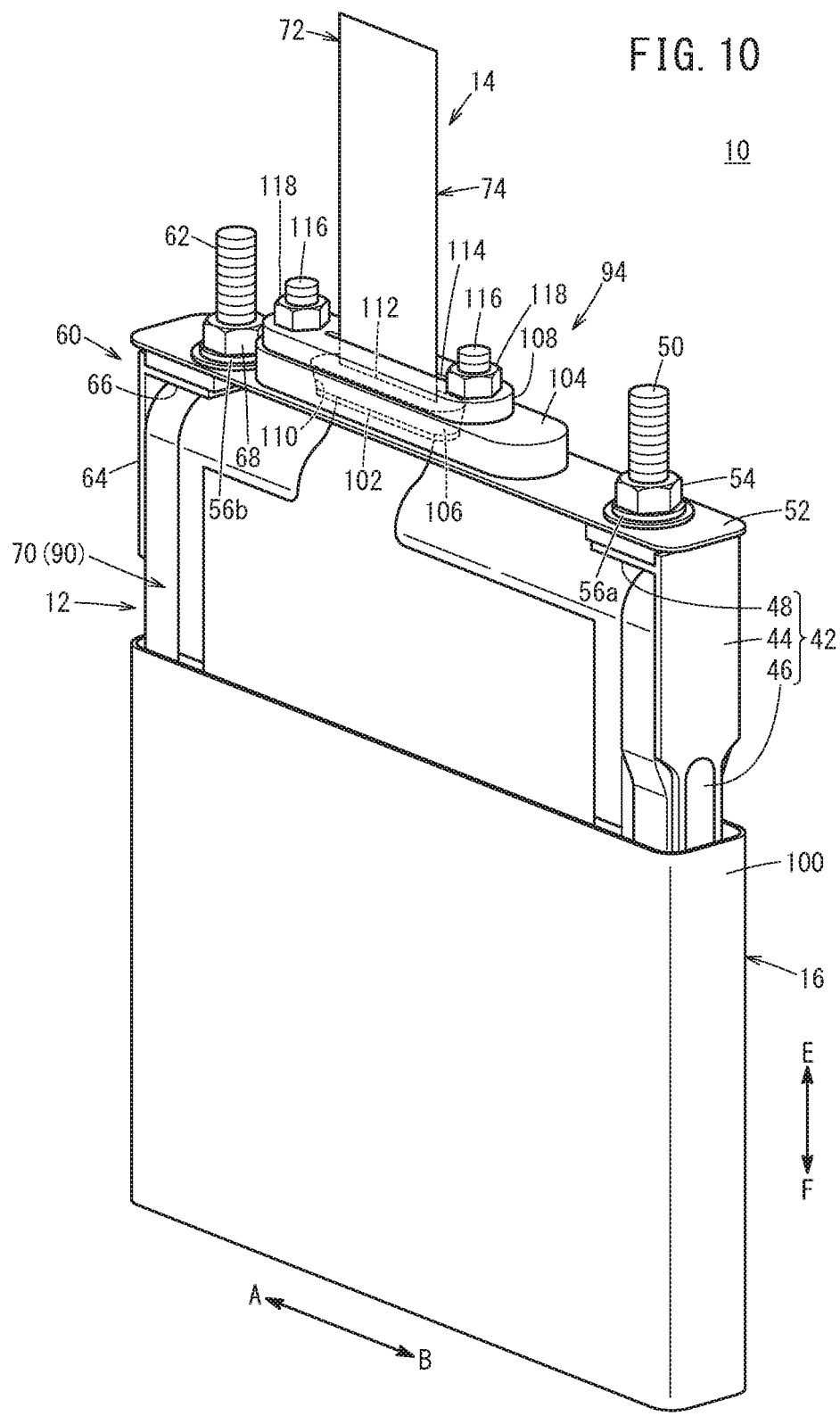
FIG. 10 is a view in the middle of placing the electrode body in FIG. 8 in an outer casing.

As shown in FIGS. 1 and 10, the secondary battery 10 has structure where an electrode body 12 is placed in a container 16 together with electrolytic solution (not shown) and part of a resin film 14. As shown in FIGS. 2 and 3, the electrode body 12 is formed by a stack body 26 obtained by stacking a separator 18, a negative electrode 20, a separator 22, and a positive electrode 24 in the recited order. Each of the separator 18, the negative electrode 20, the separator 22, and the positive electrode 24 has an elongated band shape.

Figure 9:
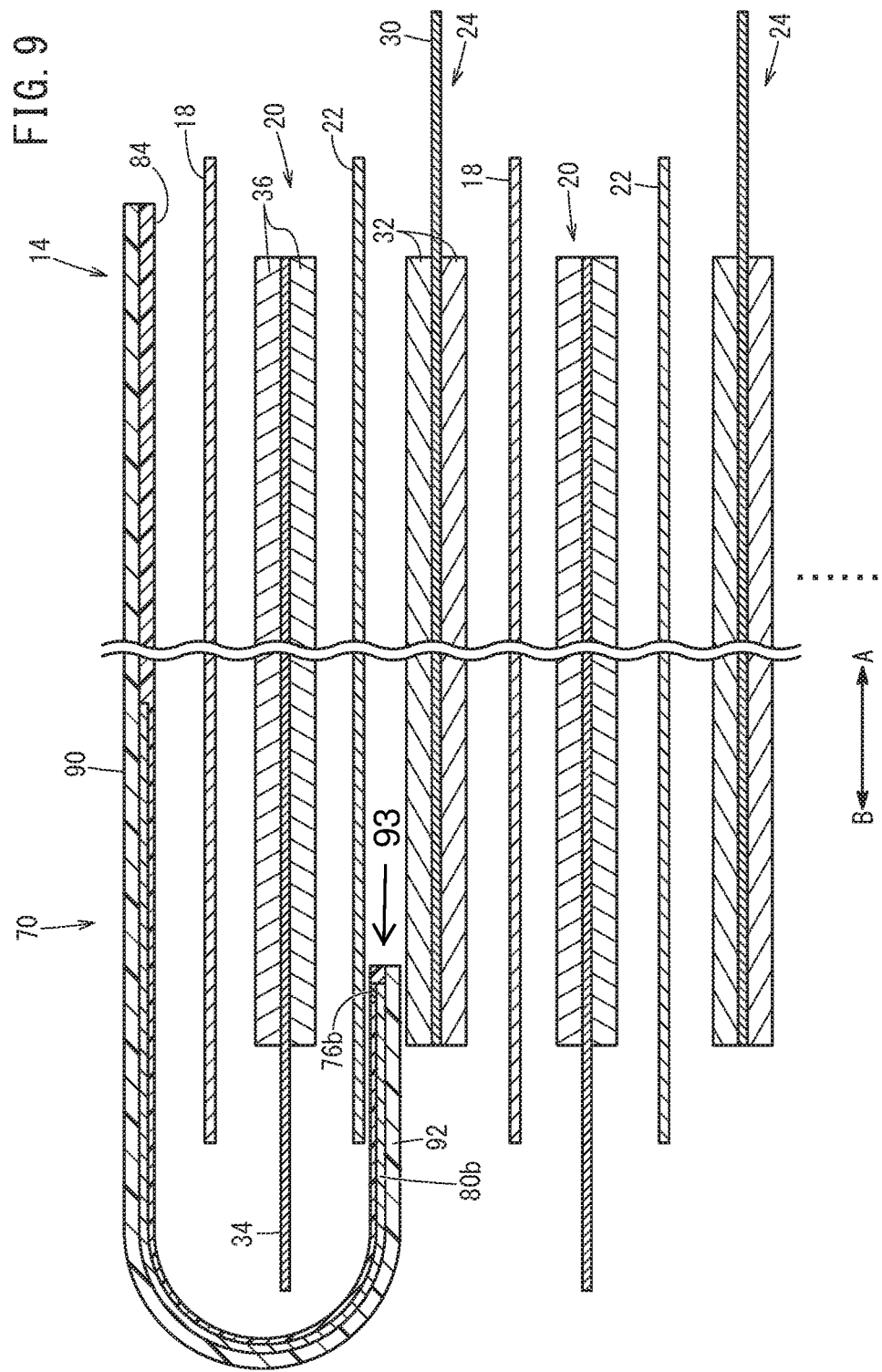
FIG. 9 is a cross sectional view taken along a line IX-IX in FIG. 8.

Specifically, as shown in FIGS. 2 and 9, the positive electrode 24 includes a positive electrode current collector film 30 made of aluminum, etc. in the form of elongated band, and a positive electrode mixture layer 32 provided on both surfaces of the positive electrode current collector film 30. The width of the positive electrode mixture layer 32 is smaller than the width the positive electrode current collector film 30, and the length of the positive electrode mixture layer 32 is substantially the same as the length of the positive electrode current collector film 30. That is, the positive electrode mixture layer 32 exposes one end of the positive electrode current collector film 30 in the width direction (indicated by an arrow A in FIG. 2), over the entire length of the positive electrode current collector film 30.

Further, the positive electrode mixture layer 32 contains positive electrode active material, conduction supporting agent, and binder (all not shown) at suitable proportions. Examples of the positive electrode active material include $LiCo_{1/3}Ni_{1/3}Mn_{1/3}O_2$, $LiCoO_2$, $LiMnO_2$, $LiMn_2O_4$, $LiNiO_2$, $LiFePO_4$, $Li_2FePO_4F$, $Li(Li_aNi_xMn_yCo_z)O_2$, etc. Examples of material of the conduction supporting agent include carbon black, etc. Examples of material of the binder include polyvinylidene difluoride (PVDF).

The negative electrode 20 includes a negative electrode current collector film 34 made of copper, etc. in the form of an elongated band, and a negative electrode mixture layer 36 provided on both surfaces of the negative electrode current collector film 34. The thickness of the negative electrode current collector film 34 is smaller than the thickness of the positive electrode current collector film 30, the width of the negative electrode current collector film 34 is the same as the width of the positive electrode current collector film 30, and the length of the negative electrode current collector film 34 is larger than the length of the positive electrode current collector film 30. The width of the negative electrode mixture layer 36 is smaller than the width of the negative electrode current collector film 34, and the length of the negative electrode mixture layer 36 is substantially the same as the length of the negative electrode current collector film 34. In the structure, the negative electrode mixture layer 36 exposes the other end of the negative electrode current collector film 34 in the width direction (indicated by an arrow B), over the entire length of the negative electrode current collector film 34.

Further, the negative electrode mixture layer 36 contains negative electrode active material and binder (all not shown) at suitable proportions. Examples of the negative electrode active material include carbon (C), Li, and Li alloy, $Li_4Ti_5O_{12}$, Si, Ge, Sn, and Sn alloy, Al, and Al alloy, Si oxide, Sn oxide, Al oxide, etc. The binder contained in the negative electrode mixture layer 36 and the binder contained in the positive electrode mixture layer 32 may be of the same type.

Each of the separators 18, 22 is made of, e.g., microporous polyethylene. The width of the separators 18, 22 is smaller than the widths of the positive electrode current collector film 30 and the negative electrode current collector film 34, and the length of the separators 18, 22 is larger than the length of the negative electrode current collector film 34. In the structure, as shown in FIG. 2, in the stack body 26, the separators 18, 22 extend toward both ends in the length direction (indicated by arrows C and D) beyond the positive electrode current collector film 30 and the negative electrode current collector film 34, and the negative electrode current collector film 34 extends toward both ends in the length direction (indicated by the arrows C and D) beyond the positive electrode current collector film 30.

The stack body 26 is wound from one end in the length direction indicated by the arrow C toward the direction indicated by an arrow X in FIG. 2, around a core member 38 to form a flat wound body. Further, as shown in FIGS. 2 and 3, an end of the separator 18, at the other end of the stack body 26 in the length direction of the stack body 26 indicated by the arrow D is fixed to a surface of the separator 18 forming the outer circumferential surface the wound body, e.g., using a tape 40 of polyphenylene sulfide (PPS). In this manner, the electrode body 12 is formed in a manner that the electrode body 12 includes a portion where the positive electrode 24, the negative electrode 20, and the separators 18, 22 are stacked together a plurality of times.

In the electrode body 12 obtained in the manner as described above, as shown in FIG. 3, a stack part 30*a* of the positive electrode current collector film 30 exposed from the separators 18, 22 is provided at one end (indicated by an arrow A) in the width direction, and a stack part 34*a* of the negative electrode current collector film 34 exposed from the separators 18, 22 is provided at the other end in the width direction indicated by the arrow B.

Figure 4:
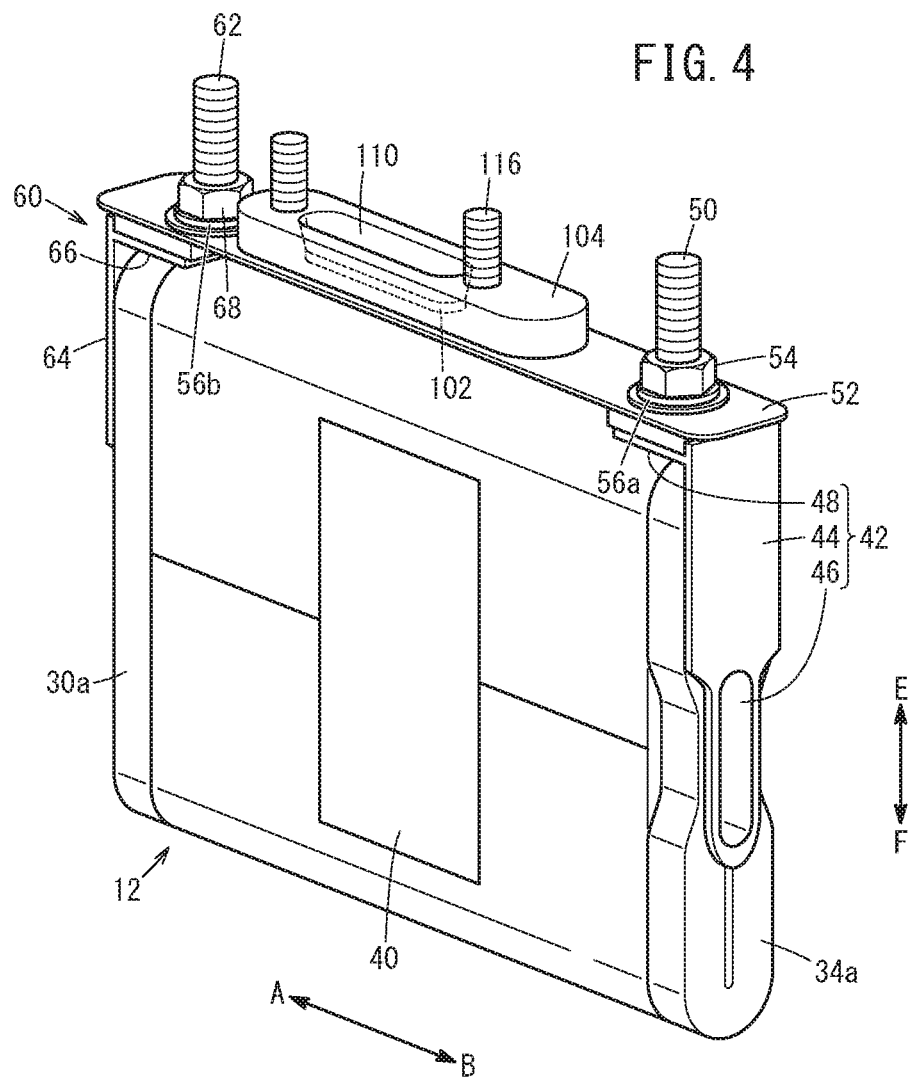
FIG. 4 is a perspective view showing a state where the electrode body of FIG. 3 is provided with a positive electrode current collector plate and a negative electrode current collector plate, a positive electrode terminal and a negative electrode terminal, and a sealing body.

As shown in FIG. 4, a negative electrode current collector plate 42 is electrically connected to the stack part 34*a* of the negative electrode current collector film 34. The negative electrode current collector plate 42 includes a plate part 44, a cylindrical protrusion 46, and a projection 48 that are formed integrally. The plate part 44 extends along the end surface of the stack part 34*a*. The cylindrical protrusion 46 extends from the plate part 44, and the cylindrical protrusion 46 is inserted between stack surfaces of the stack part 34*a*. The projection 48 protrudes from the plate part 44 in the same direction as the cylindrical protrusion 46, along a part of the outer circumferential surface on the short diameter side of the electrode body 12.

In the stack part 34*a*, for example, supersonic welding, etc. is applied to a portion where the cylindrical protrusion 46 is interposed between the stack surfaces to join the negative electrode current collector film 34 and the cylindrical protrusion 46 together. Therefore, the negative electrode current collector plate 42 is fixed to the electrode body 12. Further, a negative electrode terminal 50, and, a sealing body 52 in the form of a plate as part of the container 16 as described later is fixed to the projection 48 by a bolt, etc. using a nut 54. Therefore, the negative electrode 20 of the electrode body 12 is electrically connected to the negative electrode terminal 50 through the negative electrode current collector plate 42. The negative electrode terminal 50 is inserted into a through hole formed in the sealing body 52, and protrudes from a main surface of the sealing body 52. A projecting part of the negative electrode terminal 50 is inserted into the nut 54, and the portion between the through hole and the negative electrode terminal 50 is sealed by a seal ring 56*a*, etc. provided between the nut 54 and the main surface of the sealing body 52.

As described above, the negative electrode 20 is electrically connected to the negative electrode terminal 50 through the negative electrode current collector plate 42. In the same manner, the positive electrode 24 is electrically connected to a positive electrode terminal 62 through a positive electrode current collector plate 60 electrically connected to the stack part 30*a* of the positive electrode current collector film 30. That is, the positive electrode current collector plate 60 includes a plate part 64, a cylindrical protrusion (not shown), and a projection 66 that are formed integrally. The cylindrical protrusion is bonded to the positive electrode current collector film 30 to fix the positive electrode current collector plate 60 to the electrode body 12. Further, the positive electrode terminal 62 and a sealing body 52 are fixed to the projection 66 by a bolt, etc. using a nut 68. At this time, the positive electrode terminal 62 is inserted into a through hole formed in the sealing body 52, and the portion between the through hole and the positive electrode terminal 62 is sealed by a seal ring 56*b*, etc.

For example, solution obtained by adding supporting electrolyte such as lithium hexafluorophosphate ($LiPF_6$) of about 1M to propylene carbonate (PC), ethylene carbonate (EC), dimethyl carbonate (DMC), diethyl carbonate (DEC), ethyl methyl carbonate (EMC), vinylene carbonate (VC), etc. can be used suitably as the electrolytic solution.

Figure 5:
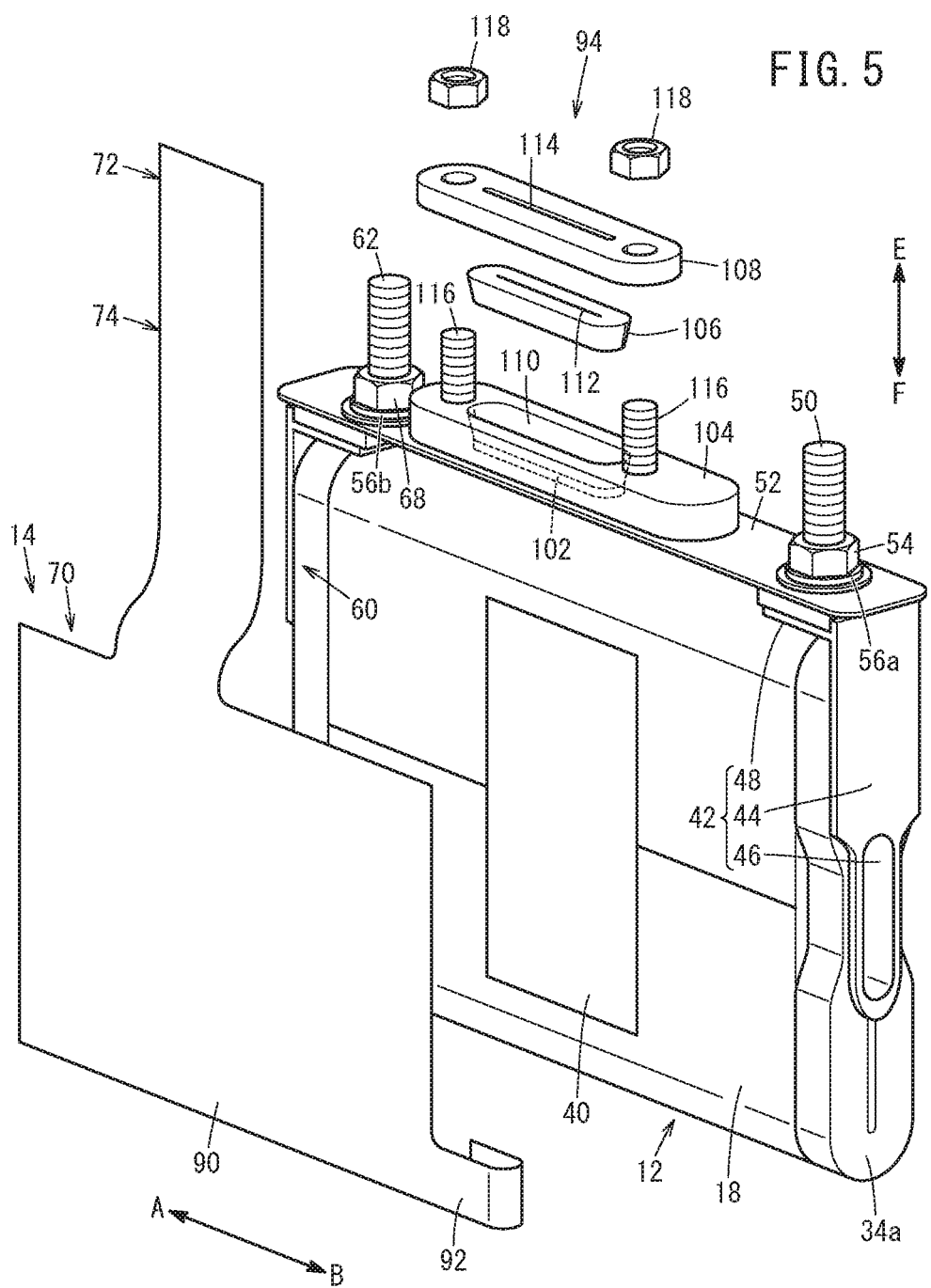
FIG. 5 is an exploded perspective view showing the electrode body in FIG. 4, a resin film, and a take-out part.
Figure 8:
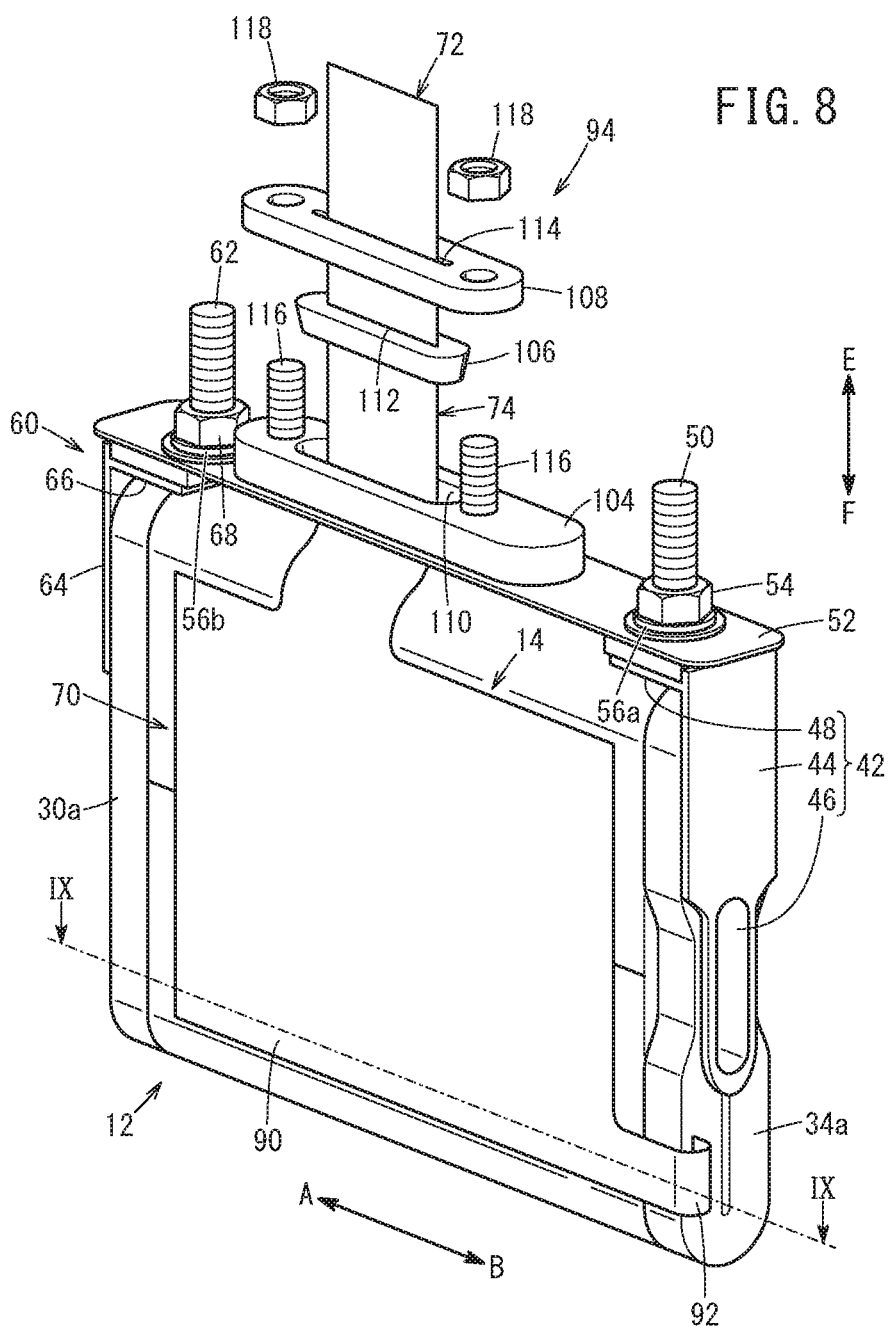
FIG. 8 is a view showing a state where the resin film is attached to the electrode body and the take-out part in FIG. 5.

As shown in FIGS. 5 and 8, the resin film 14 is provided along a part of the outer circumferential surface, on the long diameter side of the electrode body 12 in the form of the flat wound body. For example, the resin film 14 is made of resin having insulating property and heat resistant property such as polyimide or polypropylene (PP).

Further, the resin film 14 includes a detector part 70 provided inside the container 16, a terminal part 72 provided outside the container 16, and a connector part 74 extending from the inside to the outside of the container 16 to connect the detector part 70 and the terminal part 72. Further, as shown in FIG. 6, the resin film 14 is provided with e.g., two reference electrodes 76*a*, 76*b*, e.g., three temperature sensors 78*a*, 78*b*, 78*c*, film-shaped reference electrode wiring lines 80*a*, 80*b* electrically connected to the respective reference electrodes 76*a*, 76*b*, film-shaped temperature sensor wiring lines 82*a*, 82*b*, 82*c* electrically connected to the respective temperature sensors 78*a* to 78*c*, and a resin cover layer 84.

The detector part 70 includes a main part 90 and an extension part 92. The main part 90 has a rectangular shape corresponding to the shape of the electrode body 12. One surface of the main part 90 faces the separator 18 forming the outermost layer of the electrode body 12 and the tape 40. As shown in FIGS. 5, 8, and 9, the extension part 92 extends from the main part 90, and the extension part 92 is interposed between layers of the electrode body 12 in a manner that one surface of the extension part 92 faces the separator (e.g., the separator 22) which forms a layer different from a layer the main part 90 faces.

Figure 6:
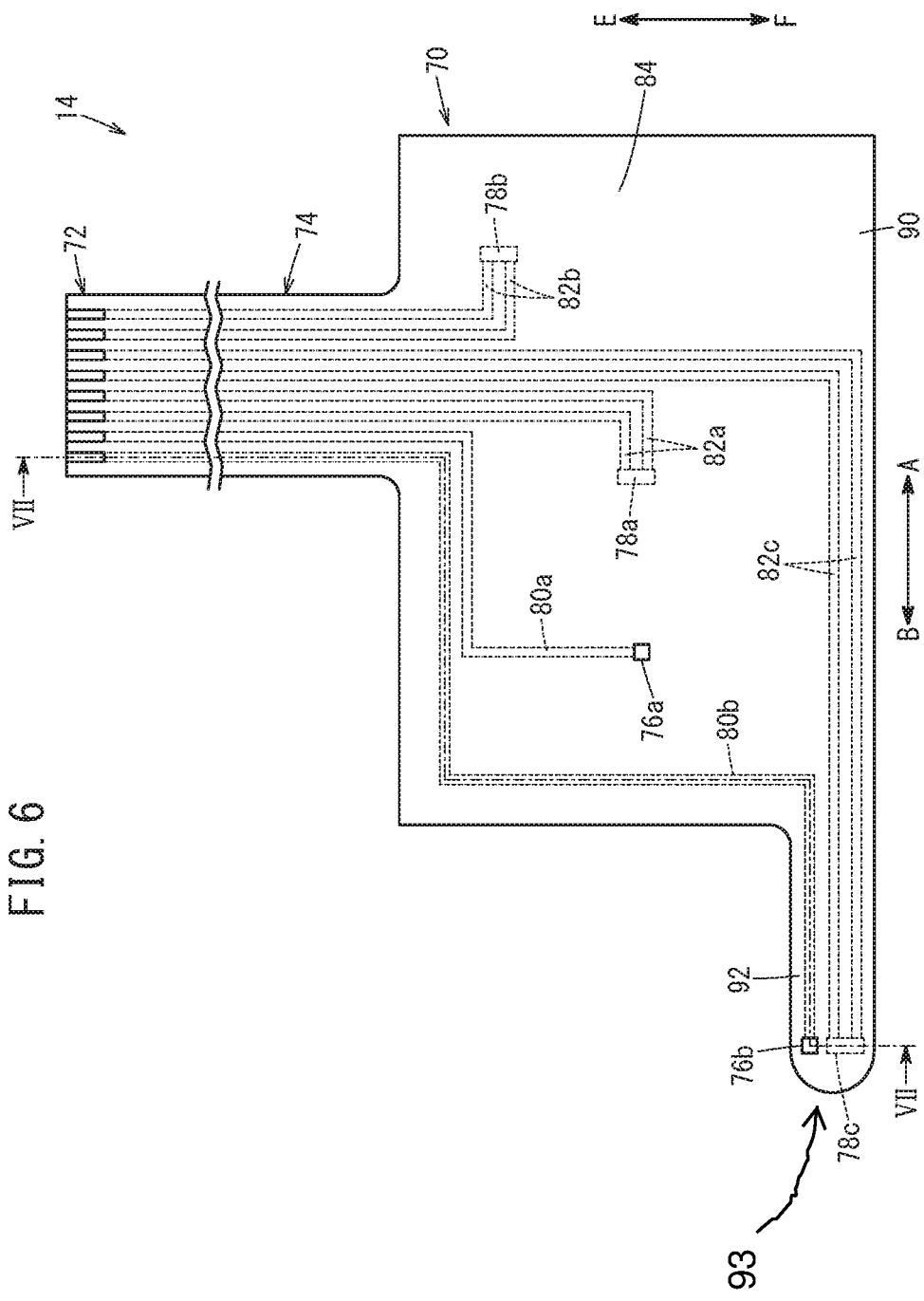
FIG. 6 is a view showing one surface of the resin film.

As shown in FIG. 6, in the first embodiment of the present invention, the detector part 70 of the resin film 14 is provided with both the main part 90 and the one extension part 92. The extension part 92 protrudes along the long side of the rectangular main part 90 in the direction indicated by the arrow F, and protrudes from the short side of the rectangular main part 90 in the direction indicated by the arrow B. Further, one reference electrode 76*a* and two temperature sensors 78*a*, 78*b* are provided on the one surface of the main part 90. Further, one reference electrode 76*b* and one temperature sensor 78*c* are provided on the one surface of the extension part 92. That is, as shown in FIG. 9, the reference electrode 76*b* and the temperature sensor 78*c* of the extension part 92 are interposed between the positive electrode 24 and the separator 22 of the electrode body 12. It will be seen from FIG. 9 that the extension part 92 extends outwardly from an outer side edge of the main part 90, bends around substantially in a U-shape as viewed in cross section, and includes a tip portion 93 which penetrates an inner portion of the electrode body 12 at an area thereof which is spaced away from the main part 90.

The reference electrodes 76*a*, 76*b* are made of, e.g., lithium titanate (LTO), and stacked on the reference electrode wiring lines 80*a*, 80*b*, respectively. The reference electrode wiring lines 80*a*, 80*b* are made of copper, nickel, etc. For example, thermocouples, thermistors, etc. can be used as the temperature sensors 78*a* to 78*c*. In the case where the temperature sensors 78*a* to 78*c* are the thermocouples, compensation lead wires, etc. are used suitably as the temperature sensor wiring lines 82*a* to 82*c*.

As shown in FIGS. 8 and 10, the connector part 74 extends from the main part 90 of the detector part 70 toward the sealing body 52. The connector part 74 is partially exposed to the outside of the container 16 through a take-out part 94 provided at the sealing body 52 as described later.

The reference electrode wiring lines 80*a*, 80*b* extend from the reference electrodes 76*a*, 76*b* of the detector part 70, respectively, through the connector part 74, and extend to the terminal part 72. Further, the temperature sensor wiring lines 82*a* to 82*c* extend from the temperature sensors 78*a* to 78*c* of the detector part 70, respectively, through the connector part 74, and extend to the terminal part 72. In this regard, the reference electrode wiring lines 80*a*, 80*b* and the temperature sensor wiring lines 82*a*, to 82*c* are electrically insulated from one another.

Figure 7:
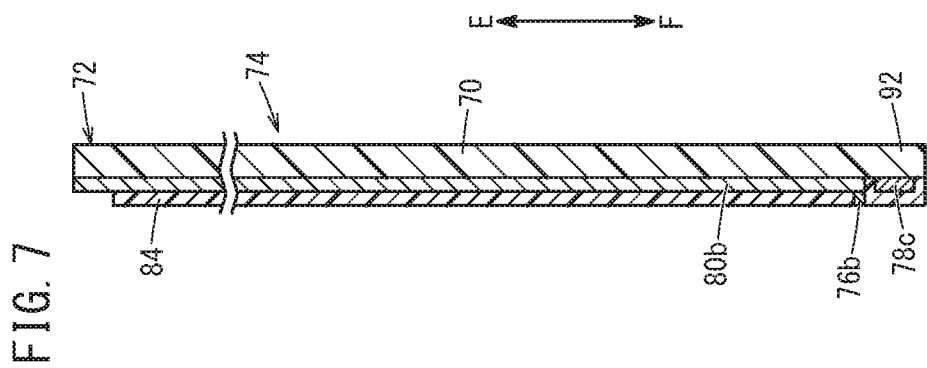
FIG. 7 is a cross sectional view taken along a line VII-VII in FIG. 6.

As in the case of the resin film 14, the resin cover layer 84 is made of resin having insulating property and heat resistance property such as polyimide or polypropylene (PP). Further, as shown in FIGS. 6 and 7, the resin cover layer 84 is provided on the detector part 70 and the connector part 74 in a manner that the resin cover layer 84 covers the temperature sensors 78*a* to 78*c*, the reference electrode wiring lines 80*a*, 80*b*, and the temperature sensor wiring lines 82*a* to 82*c*, and exposes the reference electrodes 76*a*, 76*b*.

As described above, the portion of the detector part 70 covered with the resin cover layer 84 is electrically insulated from the electrode body 12, etc. in the container 16. In this regard, since the reference electrodes 76*a*, 76*b* are exposed from the resin cover layer 84, the reference electrodes 76*a*, 76*b* can measure the electric potential differences between the reference electrodes 76*a*, 76*b* and the positive electrode 24 or the negative electrode 20.

Further, since the resin cover layer 84 is not provided on the terminal part 72, in the reference electrode wiring lines 80*a*, 80*b* and the temperature sensor wiring lines 82*a* to 82*c*, the portion provided at the terminal part 72 is exposed from the resin cover layer 84. Therefore, by connecting an external measurement instrument (not shown) to the terminal part 72, it is possible to detect measurement results obtained at the reference electrodes 76*a*, 76*b* and the temperature sensors 78*a* to 78*c*.

As shown in FIGS. 1 and 10, the container 16 is, e.g., made of aluminum or aluminum alloy. The container 16 is made up of an outer casing 100 in the form of a rectangular casing having an opening, and a sealing body 52 sealing the opening of the outer casing 100. As shown in FIGS. 5 and 10, the sealing body 52 includes a slit 102 as a take-out port for taking the connector part 74 of the resin film 14 from the inside to the outside of the container 16. For example, the take-out part 94 is fixed to a position adjacent to the slit 102, e.g., by a bolt, etc.

As shown in FIGS. 8 and 10, the take-out part 94 includes a thick plate member 104, a seal member 106, and a holder plate 108. The thick plate member 104 includes a silt 110, and the size of the slit 110 is substantially the same as the size of the slit 102 of the sealing body 52. The sealing body 52 and the thick plate member 104 are overlapped with each other in a manner that the slits 102, 110 are connected together. The seal member 106 includes a connector part 74 inserted into the slits 102, 110, and elastic material inserted between inner surfaces of the slits 102, 110 under pressure. That is, the seal member 106 has a slit 112, and the slit 112 is dimensioned such that the connector part 74 can be inserted through the slit 112 in the state where the seal member 106 and the connector part 74 are brought into contact with each other tightly.

The holder plate 108 has a slit 114 dimensioned such that the connector part 74 can be inserted into the slit 114. Further, the holder plate 108 is overlapped with the thick plate member 104 such that the holder plate 108 covers the seal member 106 inserted into the slits 102, 110 under pressure. A stack body is formed by the sealing body 52, the thick plate member 104, and the holder plate 108 in the manner as described above. Bolts 116 are inserted into both ends of the stack body in the longitudinal direction. A nut 118 is tightened to each of the bolts 116 to fix the take-out part 94 to the sealing body 52.

When the electrode body 12 provided with the resin film 14 and the sealing body 52 is placed in the outer casing 100 together with the electrolytic solution, the opening of the outer casing 100 is closed by the sealing body 52. In this state, the outer casing 100 and the sealing body 52 are bonded together in a liquid tight manner. Further, the portion between the slit 102 of the sealing body 52 and the connector part 74 is sealed by the seal member 106, etc. Therefore, it is possible to maintain the inside of the container 16 in a liquid tight manner. The sealing body 52 may be provided with a safety valve (not shown), etc. configured to be opened when the internal pressure of the container 16 reaches a predetermined pressure.

Basically, in the secondary battery 10 having the structure as described above, the positive electrode terminal 62 and the negative electrode terminal 50 are connected to an external load (not shown) to cause electrical discharge, and the positive electrode terminal 62 and the negative electrode terminal 50 are connected to an external power supply (not show) to cause electric charge. Further, since the reference electrodes 76a, 76b can be connected to the positive electrode terminal 62 or the negative electrode terminal 50 through the reference electrode wiring lines 80a, 80b provided on the terminal part 72, it is possible to measure the electric potential of each of the positive electrode 24 and the negative electrode 20. Further, the temperatures at plurality of positions where the temperature sensors 78a to 78c are provided in the container 16 can be detected through the temperature sensor wiring lines 82a to 82c in the terminal part 72.

In the secondary battery 10, as described above, the film-shaped reference electrode wiring lines 80a, 80b and the film-shaped temperature sensor wiring lines 82a to 82c are provided on the insulating resin film 14. Therefore, the reference electrode wiring lines 80a, 80b and the temperature sensor wiring lines 82a to 82c can be provided easily in the state where the reference electrode wiring lines 80a, 80b and the temperature sensor wiring lines 82a to 82c are electrically insulated from one another. In the structure, the measurements results by the reference electrodes 76a, 76b and the temperature sensors 78a to 78c can be detected independently without any interference. That is, the electric potential differences between the reference electrodes 76a, 76b and the positive electrode 24 or the negative electrode 20 can be detected using the reference electrode wiring lines 80a, 80b without any electric noises. Likewise, the temperatures inside the container 16 measured by the temperature sensors 78a to 78c can be detected using the temperature sensor wiring lines 82a to 82c without any electric noises.

Further, simply by providing the detector part 70 in a manner that one surface of the detector part 70 where the reference electrodes 76a, 76b are exposed from the resin cover layer 84 faces the separator 18 or the separator 22, the reference electrodes 76a, 76b and the temperature sensors 78a to 78c, etc. can be provided inside the container 16 in the state where the reference electrodes 76a, 76b, the temperature sensors 78a to 78c, etc. are electrically insulated from the positive electrode 24 and the negative electrode 20.

Therefore, for example, unlike the case where the reference electrodes 76a, 76b, the temperature sensors 78a to 78c, etc. are provided between the separators (not shown) additionally provided between the positive electrode 24 and the negative electrode 20, it is possible suppress the excessive overpotential or overvoltage due to the increase in the distance between the positive electrode 24 and the negative electrode 20. Further, unlike the case where the reference electrode 76a, 76b and the temperature sensors 78a to 78c are provided at positions where the positive electrode 24 and the negative electrode 20 do not face each other, it is possible to suppress situations where the overpotential becomes excessive due to the increase in the distance between the positive electrode 24 or the negative electrode 20 and the reference electrodes 76a, 76b, and it is possible to suppress the increase in the distance between the portion where temperature changes easily inside the container 16 and the temperature sensors 78a to 78c.

Further, the reference electrode wiring lines 80a, 80b, and the temperature sensor wiring lines 82a to 82c provided on the resin film 14 are in the form of films, and covered with the resin cover layer 84. The reference electrode wiring lines 80a, 80b and the temperature sensor wiring lines 82a to 82c, etc. are brought into surface contact with the positive electrode 24 or the negative electrode 20 and/or the separators 18, 22 through the resin cover layer 84. Therefore, for example, unlike the case where the wiring lines are metal wires (not shown) which are in line contact with the positive electrode 24 or the negative electrode 20 and/or the separators 18, 22, it is possible to avoid the excessive load from being applied to the positive electrode 24, the negative electrode 20, and the separators 18, 22. In the structure, since it is possible to suppress damage of the positive electrode 24, the negative electrode 20, and the separators 18, 22, etc., there is no concern that short-circuiting of the reference electrode wiring lines 80a, 80b and/or the temperature sensor wiring lines 82a to 82c, etc. with the positive electrode 24 or the negative electrode 20 occurs, and measurement of the electric potential and/or the temperature becomes difficult.

Furthermore, in the film-shaped connector part 74 provided with the film-shaped reference electrode wiring lines 80a, 80b and the film-shaped temperature sensor wiring lines 82a to 82c, and the resin cover layer 84 covering the reference electrode wiring lines 80a, 80b and the temperature sensor wiring lines 82a to 82c, the portion facing the inner surface, etc. of the slit 102 for taking the connector part 74 from the inside to the outside of the container 16 has substantially the flat surface.

Further, if the numbers of the reference electrodes 76a, 76b and the number of temperature sensors 78a to 78c are increased to improve the measurement accuracy, the number of reference electrode wiring lines 80a, 80b and the number of temperature sensor wiring lines 82a to 82c provided on the connector part 74 are increased as well. Also in this case, since the number of the connector part 74 itself does not change, there is no need to provide any additional slit 102 and/or any take-out part 94. Further, the portion where the connector part 74 faces the inner surface, etc. of the slit 102 remains substantially the flat surface. Therefore, regardless of the number of the reference electrodes 76a, 76b and the number of the temperature sensors 78a to 78c, it is possible to seal the portion between the connector part 74 and the container 16 easily, and maintain the liquid tightness of the inside of the container 16 suitably.

As described above, in the secondary battery 10, it is possible to measure the electric potentials of the positive electrode 24 and the negative electrode 20, and the temperatures inside the container 16 highly accurately, and with the simple structure, it is possible to maintain the liquid tightness of the inside of the container 16 suitably.

Further, in the secondary battery 10, it is possible to provide the extension part 92 at the desired position in the electrode body 12 easily. Therefore, by providing suitable numbers of the reference electrodes 76a, 76b and the temperature sensors 78a to 78c at suitable positions of the extension part 92 and the main part 90, it is possible to improve the measurement accuracy of the electric potentials and the temperatures.

Further, in this secondary battery 10, by the simple structure including the slit 102 provided for the sealing body 52, the seal member 106 inserted into the slit 102, etc. under pressure, and the holder plate 108, it is possible to maintain the liquid tightness of the inside of the container 16. In this regard, by covering the seal member 106 inserted into the slit 102, etc. under pressure with the holder plate 108, further improvement in the reliability of sealing the container 16 is achieved.

The present invention is not limited to the above described embodiment specifically. Various changes can be made without deviating from the gist of the present invention.

In the detector part 70 of the above embodiment, as shown in FIG. 6, one extension part 92 is provided along the long side of the rectangular main part 90 in the direction indicated by the arrow F. The extension part 92 protrudes from the short side of the rectangular main part 90 in the direction indicated by the arrow B. Further, in the detector part 70, one reference electrode is provided for each of the main part 90 and the extension part 92. That is, in total, the two reference electrodes 76a, 76b are provided. Further, the two temperature sensors 78a, 78b are provided on the main part 90, and one temperature sensor 78c is provided on the extension part 92.

However, the number and the position(s) of the extension part(s) 92 provided on the detector part 70, and the number and the position(s) of the reference electrodes 76a, 76b and the temperature sensors 78a to 78c are not limited to those of the embodiment especially.

Figure 11:
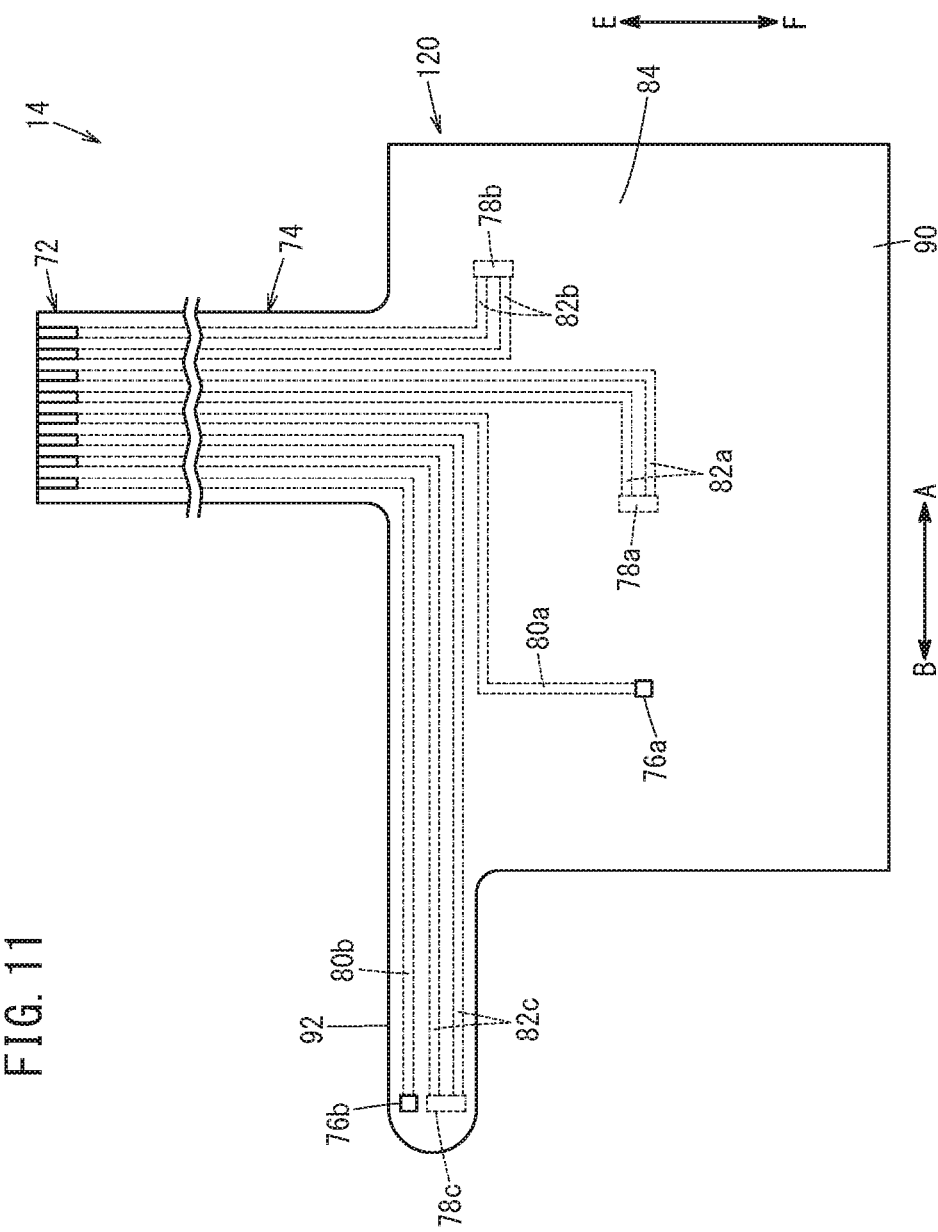
FIG. 11 is a view showing one surface of a resin film according to another embodiment.
Figure 12:
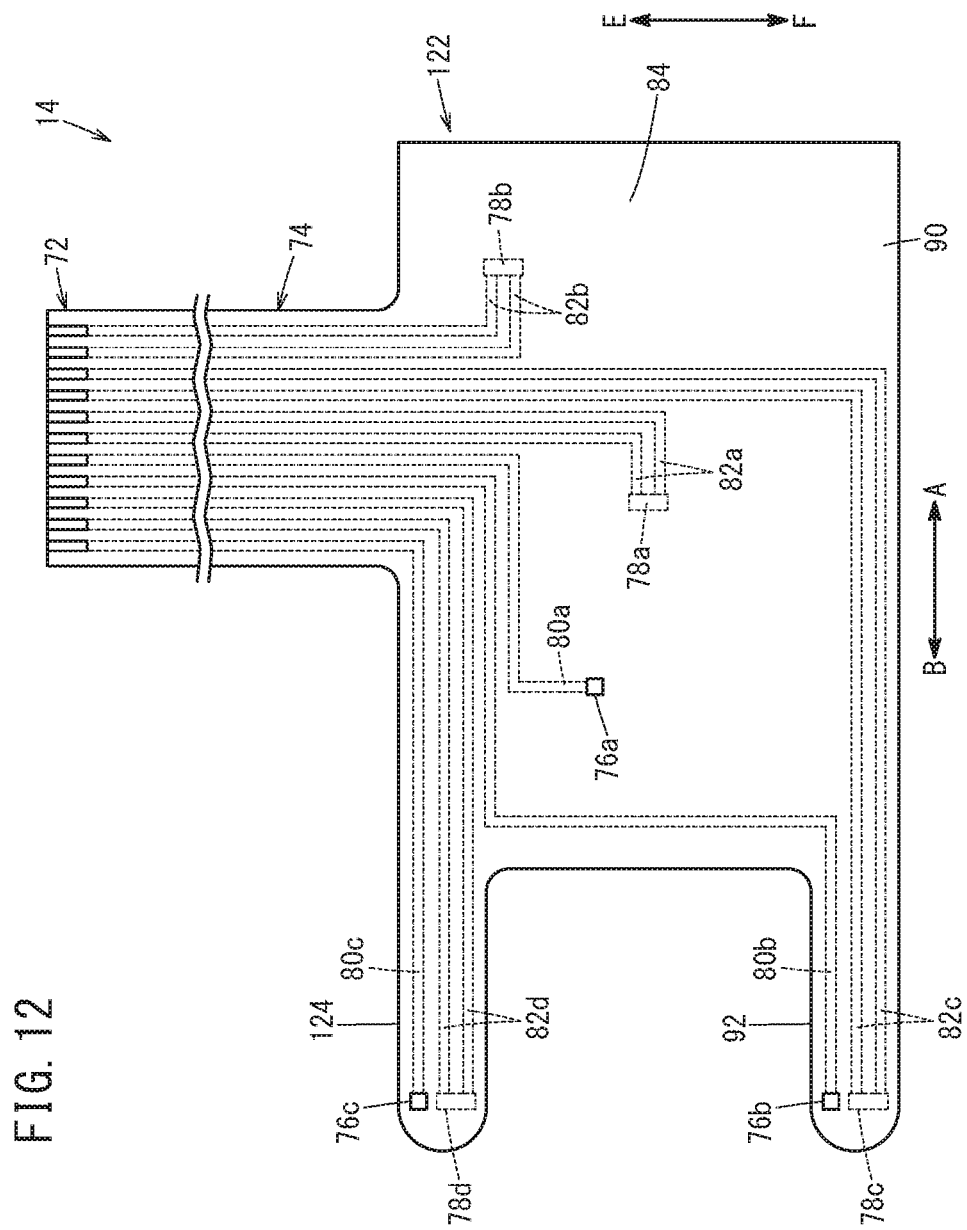
FIG. 12 is a view showing one surface of a resin film according to still another embodiment.
Figure 13:
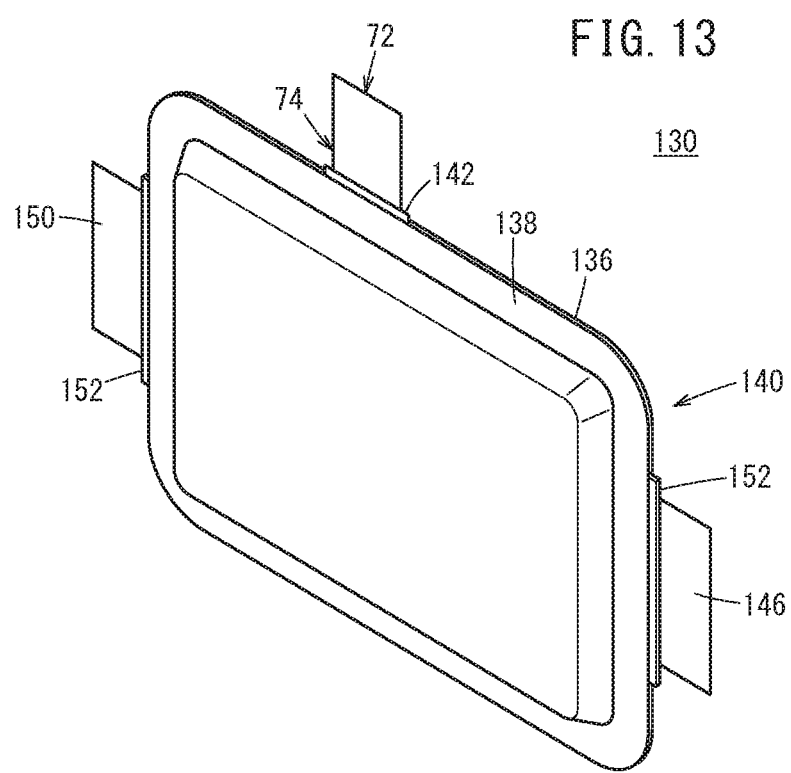
FIG. 13 is a perspective view showing outer appearance of a secondary battery according to another embodiment.

For example, as in the case of a detector part 120 shown in FIG. 11, one extension part 92 may be provided along the long side of the rectangular main part 90 in the direction indicated by the arrow E such that the extension part 92 extends from the short side of the rectangular main part 90 in the direction indicated by the arrow B. In FIG. 11, and FIGS. 12 and 13 described later, the constituent elements that have functions and effects identical or similar to those shown in FIGS. 1 to 10 are labeled with the same reference numerals, and the detailed description is omitted.

Further, as in the case of a detector part 122 shown in FIG. 12, two extension parts 92, 124 may be provided along both of long sides of the rectangular main part 90 in the direction indicated by the arrows E and F such that the extension parts 92, 124 protrude from the short side of the rectangular main part 90 in the direction indicated by the arrow B. In the detector part 122 shown in FIG. 12, the reference electrodes 76b, 76c and the temperature sensors 78c, 78d are provided for the two extension parts 92, 124, respectively. That is, in total, three reference electrodes 76a to 76c are provided, and in total, four temperature sensors 78a to 78d are provided on the detector part 122. In this case, the reference electrode wiring lines 80a, 80b, 80c and the temperature sensor wiring lines 82a, 82b, 82c, 82d in the numbers corresponding to the reference electrodes 76a to 76c and the temperature sensors 78a to 78d are provided on the resin film 14.

The secondary battery 10 according to the embodiment of the present invention includes the electrode body 12 in the form of a flat wound body, and the container 16 including the outer casing 100 having the shape capable of containing the electrode body 12 and the sealing body 52. However, the present invention is not limited in this respect. For example, as in the case of a secondary battery 130 shown in FIGS. 13 and 14, an electrode body 134 formed by stacking a rectangular positive electrode and a rectangular negative electrode (both not shown) and a separator 132 together a plurality of times, and a container 140 made up of laminate films 136, 138 sandwiching the electrode body 134 may be provided. Also in this secondary battery 130, the same effects and advantages as in the case of the above secondary battery 10 can be obtained.

Specifically, as in the case of the above electrode body 12, also for the electrode body 134 of the secondary battery 130, the resin film 14 is provided on the separator 132 at one end in the stacking direction such that one surface of the resin film 14 extends along the separator 132. The connector part 74 of the resin film 14 extends from the inside to the outside of the container 140 through a seal member 142 made of thermally adhesive resin provided between outer marginal portions of the laminate films 136, 138.

Further, the positive electrode of the electrode body 134 is electrically connected to a film-shaped positive electrode terminal 146 through a positive electrode current collector plate 144. Further, the negative electrode of the electrode body 134 is electrically connected to a film-shaped negative electrode terminal 150 through a negative electrode current collector plate 148. The positive electrode terminal 146 and the negative electrode terminal 150 also extend from the inside to the outside of the container 140 through seal members 152 made of thermally adhesive resin provided between the outer marginal portions of laminate films 136, 138.

That is, for example, only by forming the container 140 by heat sealing the outer marginal portions of the two laminate films 136, 138 sandwiching the resin film 14, the electrode body 134, and the electrolytic solution, it is possible to seal the portion between the inner surfaces of the outer marginal portions and the connector part 74 by the seal member 142 easily. Moreover, it is possible to seal the portion between the inner surfaces of the outer marginal portions and each of the positive electrode terminal 146 and the negative electrode terminal 150 by the seal members 152 easily. As a result, it is possible to maintain the liquid tightness of the container 140 easily and suitably.

A test body of the secondary battery 10 according to the embodiment was prepared. Specifically, the positive electrode current collector film 30 was made of aluminum to have the thickness of 0.015 mm, the width of 100 mm, and the length of 4000 mm. The positive electrode mixture layer 32 was formed by mixing the positive electrode active material, the conduction supporting agent, and the binder at the ratios of 90:5:5. The width of the positive electrode mixture layer 32 was 80 mm, and the length of the positive electrode mixture layer 32 was 4200 mm. As the positive electrode active material, the conduction supporting agent, and the binder, $LiCo_{1/3}Ni_{1/3}Mn_{1/3}O_2$, acetylene black, polyvinylidene difluoride were adopted, respectively.

The negative electrode current collector film 34 was made of copper, to have the thickness of 0.010 mm, the width of 110 mm, and the length of 4500 mm. The negative electrode mixture layer was formed by mixing the negative electrode active material and the binder at the ratios of 90:10. The width of the negative electrode mixture layer 36 was 90 mm, and the length of the negative electrode mixture layer 36 was 4500 mm. As the negative electrode active material, graphite and polyvinylidene difluoride were adopted, respectively.

Each of the separators 18, 22 were made of microporous polyethylene to have the width of 100 mm, and the length of 4800 mm. As the electrolytic solution, solution obtained by adding supporting electrolyte of lithium hexafluorophosphate ($LiPF_6$) of 1M to solution obtained by mixing dimethyl carbonate (DMC), ethyl methyl carbonate (EMC), propylene carbonate (PC) at the ratios of 1:1:1 was used. The resin film 14 was made of polyimide to have the thickness of 50.0 μm. The resin film 14 was provided with only one reference electrode 76b. The reference electrode 76b was made of lithium titanate. As for the reference electrode 76b, a battery (not shown) having the reference electrode 76b and a counter electrode of lithium (Li) was prepared additionally, and the battery was used to cause electric charge/discharge to adjust the ratio (state of charge: SOC) of the charging quantity to the battery capacity to 50% beforehand. Thereafter, the reference electrode 76b was integrated into the test body. In this regard, the electric potential of the reference electrode 76b relative to the Li electrode (hereinafter also referred to as Vref) exhibits the plateau at 1.56 V.

The reference electrode wiring line 80b was made of nickel to have the thickness of 0.3 μm. As the temperature sensors 78a to 78c, thermocouples of chromel and alumel wires were used. Each of the chromel and alumel wires has the thickness of 1.0 μm.

A charging/discharging test was conducted on the test body of the secondary battery 10 comprising the above constituent elements. At this time, for each predetermined electric discharge capacity, the electric potential difference between the positive electrode 24 and the reference electrode 76b (hereinafter also referred to as "Vcat vs ref") and the electric potential difference between the positive electrode 24 and the negative electrode 20 (hereinafter also referred to as "Vcat vs ano") were measured.

In this regard, the relationship of "Vcat vs ano"=Vcat−Vano and the relationship of "Vcat vs ref"=Vcat−Vref are satisfied, where Vcat denotes the electric potential of the positive electrode 24 relative to the Li electrode, and Vano denotes the electric potential of the negative electrode 20 relative to the Li electrode.

That is, the relationship of Vcat="Vcat vs ref"+Vref and the relationship of Vano=Vcat−"Vcat vs ano" are satisfied.

As described above, Vref is 1.56 V. Therefore, in the secondary battery 10, by measuring "Vcat vs ref" using the reference electrode 76b and the positive electrode terminal 62, and measuring "Vcat vs ano" using the positive electrode terminal 62 and the negative electrode terminal 50, it was possible to determine each of the electric potentials (vsLi) of the positive electrode 24 and the negative electrode 20 for each electric discharge capacity.

Further, it has been proven that, at the time of conducting the electric charging/discharging test, temperature changes of the secondary battery 10 in correspondence with electric charge and electric discharge can be measured suitably in all of the temperature sensors 78a to 78c.

What is claimed is:

1. A secondary battery comprising a container containing an electrode body and electrolytic solution, the electrode body including a positive electrode and a negative electrode configured to face each other through a separator, the secondary battery further comprising:
    a resin film comprising a detector part provided inside the container, a terminal part provided outside the container, and a connector part extending from inside to outside of the container through a seal member and connecting the detector part and the terminal part;
    at least one reference electrode and at least one temperature sensor provided for the detector part;
    a film-shaped reference electrode wiring line, one end of the reference electrode wiring line being electrically connected to the reference electrode and another end of the reference electrode wiring line extending to the terminal part through the connector part;
    a film-shaped temperature sensor wiring line, one end of the temperature sensor wiring line being electrically connected to the temperature sensor and another end of the temperature sensor wiring line extending to the terminal part through the connector part, the film-shaped temperature sensor wiring line being electrically insulated from the reference electrode wiring line; and
    an insulating resin cover layer provided for the detector part and the connector part, and configured to cover the temperature sensor, the reference electrode wiring line, and the temperature sensor wiring line, and expose the reference electrode,
wherein:
    the electrode body includes a portion where the positive electrode, the negative electrode, and the separator are stacked together a plurality of times, creating a plurality of layers;
    the detector part of the resin film includes a main part with one surface facing the separator at an outer layer of the electrode body, and at least one extension part attached to and extending outwardly from the main part, the extension part comprising a tip portion which is interposed between the layers of the electrode body in a manner such that one surface of the tip portion faces an inner layer of the separator which is spaced away from the outer layer faced by the main part,
    and at least one of the reference electrode and the temperature sensor is provided on the tip portion of the extension part.

2. The secondary battery according to claim 1, wherein the connector part extends from the inside to the outside of the container through a slit provided for the container;
    the seal member is made of elastic material inserted between an inner surface of the slit and the connector part under pressure; and
    a holder plate covering the seal member in the slit is fixed to the container.

3. The secondary battery according to claim 1, wherein the container is in form of a laminate film; and the seal member is made of resin configured to bond an inner surface of an outer marginal portion of the container and the connector part together.

4. The secondary battery according to claim 1, wherein the extension part has both a temperature sensor and a reference electrode thereon.

5. A secondary battery comprising a container containing an electrode body and electrolytic solution, the electrode body including a positive electrode and a negative electrode configured to face each other through a separator, the secondary battery further comprising:
    a resin film comprising a detector part provided inside the container, a terminal part provided outside the container, and a connector part extending from inside to outside of the container through a seal member and connecting the detector part and the terminal part;
    at least one reference electrode and at least one temperature sensor provided for the detector part;
    a film-shaped reference electrode wiring line, one end of the reference electrode wiring line being electrically connected to the reference electrode and another end of the reference electrode wiring line extending to the terminal part through the connector part;
    a film-shaped temperature sensor wiring line, one end of the temperature sensor wiring line being electrically connected to the temperature sensor and another end of the temperature sensor wiring line extending to the terminal part through the connector part, the film-shaped temperature sensor wiring line being electrically insulated from the reference electrode wiring line; and
    an insulating resin cover layer provided for the detector part and the connector part, and configured to cover the temperature sensor, the reference electrode wiring line, and the temperature sensor wiring line, and expose the reference electrode, wherein the detector part of the resin film includes a main part with one surface facing the separator at an outer layer of the electrode body, and at least one extension part attached to and extending outwardly from the main part, and wherein the extension part extends outwardly from an outer edge of the main part, bends around substantially in a U-shape as viewed in cross section, and includes a tip portion which penetrates an inner portion of the electrode body at an area thereof which is spaced away from the main part.

6. The secondary battery according to claim 5, wherein the main part of the detector part is substantially flat, and the tip portion of the extension part is substantially parallel to the main part.

7. The secondary battery according to claim 5, wherein the tip portion of the extension part has at least one of a temperature sensor and a reference electrode thereon.

8. The secondary battery according to claim 5, wherein the tip portion of the extension part has both a temperature sensor and a reference electrode thereon.

9. The secondary battery of claim 1, wherein the extension part extends outwardly from an outer side edge of the main part, bends around substantially in a U-shape as viewed in cross section, and includes a tip portion which penetrates an inner portion of the electrode body at an area thereof which is spaced away from the main part.

* * * * *